Patented Dec. 3, 1929

1,738,022

UNITED STATES PATENT OFFICE

JEROME P. STRASSER, OF NEW YORK, N. Y.

WATERPROOF CEMENT

No Drawing.   Application filed June 28, 1924.   Serial No. 722,945.

My invention relates to improvements in cements and in the method of preparing the improvement. The object of my invention is to produce a strong cement which can be easily made and used, and which is waterproof and adapted for a great variety of uses. I have found that by properly combining asphaltum and dextrine, the latter containing preferably borax and a preservative and astringent, such for instance as formaldehyde, I obtain a cement having the water-proofing characteristics of asphaltum, and the adhesive qualities of the asphaltum greatly augmented by the adhesive qualities of the dextrine, and the borax which the dextrine contains, and the added astringent preservative tends further to strengthen, toughen, and keep the mixture in shape for proper use. The proportions of the asphaltum and the dextrine glue with its other constituents as stated, vary according to the use to which the cement is to be put and the nature of the asphaltum.

A great difficulty with most asphaltum is that it substantially solidifies at normal temperatures, and therefore can only be used when hot, and a difficulty of dextrine glue is that it is hygroscopic, and under damp conditions softens and ceases to serve its proper function. By combining the two, however, I produce an adhesive or cement having the waterproofing properties of asphaltum and the adhesiveness or tackiness of dextrine. The consistency of the resulting composition can be varied over a wide range depending upon the use to which it is to be put. For example, I can have the cement thus formed of heavy body requiring a trowel or the like to apply it, or can have it liquid so that it can be applied with a brush, or will coat the substance immersed in it. Thus it will be seen that the proportions of the asphaltum and the dextrine solution mixed with it can vary widely and still come within the scope of my invention.

Another feature of my invention consists in the manner in which the parts are combined. I have found that the better way is to combine the asphaltum with the dextrine in the form of a solution, and to accomplish the right mixture, it is desirable to heat the asphaltum to a liquid condition, and raise the temperature of the dextrine solution to a higher degree, and then mingle the two. If the two liquids are mixed at the same temperature, the mixture froths and does not properly combine; but if, for example, the asphaltum is raised to a temperature of say 175° F. and the dextrine solution to 185° F., then the two will combine without frothing and will make a homogeneous mixture. The solution of dextrine serves as an excellent carrier for the asphaltum, and when they are combined as stated, the asphaltum is emulsified, and globules are held in suspension in the dextrine solution.

We will assume that a heavy cement is to be made and that the base is what is known as commercial refined asphaltum. For such heavy cement I use 50% asphaltum and 50% dextrine solution, the dextrine solution being composed of approximately 50% dextrine, 3% borax, .10% formaldehyde, and the balance water. The above is simply by way of example. Obviously the water content of the dextrine solution should be diminished as the water content of the asphaltum is increased. Furthermore, the water content of the cement as a whole will vary with the desired body of the mixture. If, for instance, the cement is to be used for laying linoleum, cork, rubber tile, floor coverings and the like, it should be heavy, and the water content will be relatively small. If it is to be used as a coating for paper, or to cement paper surfaces, or other things of like nature, the water content should be larger, and likewise a larger water content should be used where the cement was used as a dust layer for roads, in which case it should naturally be thin enough to be sprinkled over the road surface. It will also be understood that the dextrine content of the cement or adhesive may vary considerably depending upon the purpose for which the composition is to be used; for example, more dextrine in proportion to asphaltum will be used in a cement or adhesive used in laminating paper board or as a paper bag paste than in an adhesive adapted for use as a linoleum cement. However, dextrine will always be present in substantial and sufficient amounts to impart its characteristic properties of adhesiveness to the composition.

The examples given make it clear that my invention lies in the combination of asphaltum and a more or less hygroscopic adhesive like dextrine glue, and the method of mingling the parts, rather than in any precise combination of the dextrine and asphaltum. This is evident when it is considered that the asphaltum varies so greatly in its nature, and that it is sometimes manufactured from oil residuums, and is often a natural product. In some cases it is very hard at normal temperatures, in others it is plastic, and in others semi-liquid, and obviously the water content of the dextrine glue would vary in proportion as the asphaltum was thick or thin. In some of the rather liquid asphaltums the dextrine need contain very little water.

While the method of mingling described is usually the preferred method, in some cases the dextrine and asphaltum may be mixed in a mixing machine, the formaldehyde added, and the parts agitated and mingled until a uniform mixture results. In any event the ultimate cement is a homogeneous non-hygroscopic mixture containing the water-proofing characteristics of the asphaltum, the adhesive qualities of the dextrine and asphaltum, and does not solidify at normal temperatures, so that it can be conveniently used under ordinary conditions.

I have referred to formaldehyde as a preservative, and I find this entirely suitable, but other preservatives, and especially astringent preservatives of the aldehyde group, might be substituted without affecting the invention.

It will be noted that the dextrine solution acts as a carrier for the asphaltum, enabling the mixture to be used in conveniently liquid form, and the asphaltum gives the necessary water-proofing and body elements. If applied where exposed to the weather, the water will gradually evaporate, leaving the combined asphaltum and dextrine in a heavy enduring mass.

I claim:—

1. The herein described method of mixing asphaltum and a dextrine solution to form a cement, which comprises the steps of raising the asphaltum to a liquefying temperature, raising the dextrine solution to a temperature higher than that of the asphaltum, and then combining the two heated mixtures at the said relative temperatures.

2. An adhesive composition comprising a homogeneous mixture of substantially the following proportions by weight:

|  | Per cent |
|---|---|
| Asphaltum | 50 |
| Dextrine | 25 |
| Water | 23.45 |
| Borax | 1.5 |

In testimony whereof, I have signed my name to this specification this 27th day of June, 1924.

JEROME P. STRASSER.